(12) United States Patent
Yamashita et al.

(10) Patent No.: US 7,617,665 B2
(45) Date of Patent: Nov. 17, 2009

(54) MOWER HAVING CUTTING CHAMBERS

(75) Inventors: Nobuyuki Yamashita, Izumi (JP);
Hiroshi Oshima, Osaka (JP); Hiroyuki Ogasawara, Nishinomiya (JP); Toshiki Kanai, Sakai (JP)

(73) Assignee: Kubota Corporation, Osaka (JP)

( * ) Notice: Subject to any disclaimer, the term of this patent is extended or adjusted under 35 U.S.C. 154(b) by 141 days.

(21) Appl. No.: 11/714,056

(22) Filed: Mar. 5, 2007

(65) Prior Publication Data
US 2007/0289282 A1 Dec. 20, 2007

(30) Foreign Application Priority Data
Jun. 15, 2006 (JP) .............................. 2006-166051

(51) Int. Cl.
*A01D 67/00* (2006.01)
(52) U.S. Cl. .................................................... 56/320.2
(58) Field of Classification Search ................. 56/320.2, 56/13.3, 320.1, 17.4
See application file for complete search history.

(56) References Cited

U.S. PATENT DOCUMENTS

| | | | |
|---|---|---|---|
| 3,646,739 A | 3/1972 | Dahl | |
| 4,055,036 A | 10/1977 | Kidd | |
| 5,035,108 A | 7/1991 | Meyer et al. | |
| 5,210,998 A | 5/1993 | Hojo et al. | |
| 5,212,938 A | 5/1993 | Zenner et al. | |
| 5,214,906 A * | 6/1993 | Saki et al. | 56/320.2 |
| 5,267,429 A | 12/1993 | Kettler et al. | |
| 5,305,589 A | 4/1994 | Rodriguez et al. | |
| 5,390,480 A * | 2/1995 | Simonson et al. | 56/320.2 |
| 5,465,564 A | 11/1995 | Koehn et al. | |
| 5,483,790 A | 1/1996 | Kuhn et al. | |
| 5,628,171 A | 5/1997 | Stewart et al. | |
| 5,836,144 A * | 11/1998 | Hohnl et al. | 56/320.1 |
| 5,845,475 A * | 12/1998 | Busboom et al. | 56/320.1 |
| 5,894,717 A * | 4/1999 | Yamashita et al. | 56/320.1 |
| 5,987,863 A | 11/1999 | Busboom et al. | |
| 6,038,840 A * | 3/2000 | Ishimori et al. | 56/13.3 |
| 6,065,276 A * | 5/2000 | Hohnl et al. | 56/320.1 |
| 6,189,307 B1 | 2/2001 | Buss et al. | |
| 6,192,666 B1 | 2/2001 | Sugden et al. | |
| 6,779,328 B2 * | 8/2004 | Buss et al. | 56/320.1 |
| 6,782,684 B2 * | 8/2004 | Buss et al. | 56/320.2 |
| 6,848,246 B2 * | 2/2005 | Samejima et al. | 56/320.2 |
| 6,892,519 B2 * | 5/2005 | Sugden et al. | 56/320.1 |
| 6,996,962 B1 * | 2/2006 | Sugden et al. | 56/17.4 |
| 7,062,898 B2 * | 6/2006 | Sarver et al. | 56/320.1 |

(Continued)

FOREIGN PATENT DOCUMENTS

JP   2004-041060   2/2004

(Continued)

*Primary Examiner*—Árpád Fábián-Kovács
(74) *Attorney, Agent, or Firm*—The Webb Law Firm

(57) ABSTRACT

A mower includes a mower deck that opens downward; a plurality of vertical shafts rotatably supported by the mower deck; a plurality of cutting blades driven by the vertical shafts inside the mower deck; a cutting chamber formed inside the mower deck and provided for each cutting blade; and an opening formed between the cutting chambers for adjacent cutting blades. The cutting blades are arranged generally in a lateral direction with an adjacent pair of cutting blades being rotatably driven in opposite directions from each other. The opening allows for flow passage of cut grass at least from one of the cutting chambers to the other cutting chamber.

8 Claims, 6 Drawing Sheets

U.S. PATENT DOCUMENTS

| | | |
|---|---|---|
| 7,065,946 B2 * | 6/2006 | Boeck et al. ............... 56/320.1 |
| 7,458,199 B2 * | 12/2008 | Sarver et al. ............... 56/320.1 |
| 2004/0237492 A1 * | 12/2004 | Samejima et al. .......... 56/320.1 |
| 2004/0255567 A1 * | 12/2004 | Kallevig et al. ............ 56/320.2 |
| 2005/0279072 A1 * | 12/2005 | Sarver et al. ............... 56/320.1 |

FOREIGN PATENT DOCUMENTS

JP  2004-350630  12/2004

* cited by examiner

MOWER HAVING CUTTING CHAMBERS

BACKGROUND OF THE INVENTION

The present invention relates to a mower having a plurality of cutting blades driven via vertical shafts inside a mower deck, in particular to such mower suitable for effecting a mulching operation.

Examples of such mower as noted above are known from JP 2004-41060 and JP 2004-350630. In these, a mulching baffle is mounted to a mower designed for a side discharging mode operation, with a cut grass discharging outlet provided at a lateral end of a deck, and cutting chambers each having an approximately circular shape along a rotational path of the leading end of each cutting blade are formed so as to allow the mower to effect a mulching operation also.

More particularly, in the case of the mower described in JP 2004-41060, a mulching baffle is mounted so as to partition the plurality of juxtaposed cutting chambers from each other, so that cut grass can be mulched in each cutting chamber, as being carried in and out of the respective cutting chambers. In the case of the mower described in JP 2004-350630, a plurality of cutting chambers formed in juxtaposition with attachment of the mulching baffle are communicated with each other through an opening. However, the shape of opening portion of the mulching baffle is designed so as to prevent flow of cut grass in each cutting chamber into a cutting chamber adjacent thereto.

As described above, with the conventional mulching operation, cut grass is cut in each one of the plural cutting chambers, so the grass is cut repeatedly. However, cut grass will flow in the rotational direction of the cutting blade as being conveyed by an air current generated by the rotating blade. Hence, the cutting blade needs to cut the cut grass which is moving in the same direction as this blade. Therefore, it was difficult to effect a mulching operation of the cut grass in an efficient manner.

SUMMARY OF THE INVENTION

The present invention has been made in view of the above-described state of the art. A primary object of the invention is to provide a mower capable of effecting a mulching operation with higher efficiency.

According to the present invention, a mower comprises:

a mower deck that opens downward;

a plurality of vertical shafts rotatably supported by the mower deck;

a plurality of cutting blades driven by the vertical shafts inside the mower deck, the cutting blades being arranged generally in a lateral direction, adjacent pair of cutting blades being rotatably driven in opposite directions from each other;

a cutting chamber formed inside the mower deck and provided for each cutting blade; and an opening formed between the cutting chambers for adjacent cutting blades, for allowing flow passage of cut grass at least from one of the cutting chambers to the other cutting chamber.

DETAILED DESCRIPTION OF THE PREFERRED EMBODIMENTS

Preferred embodiments of the present invention will be described next with reference to the accompanying drawings.

Figure 1:
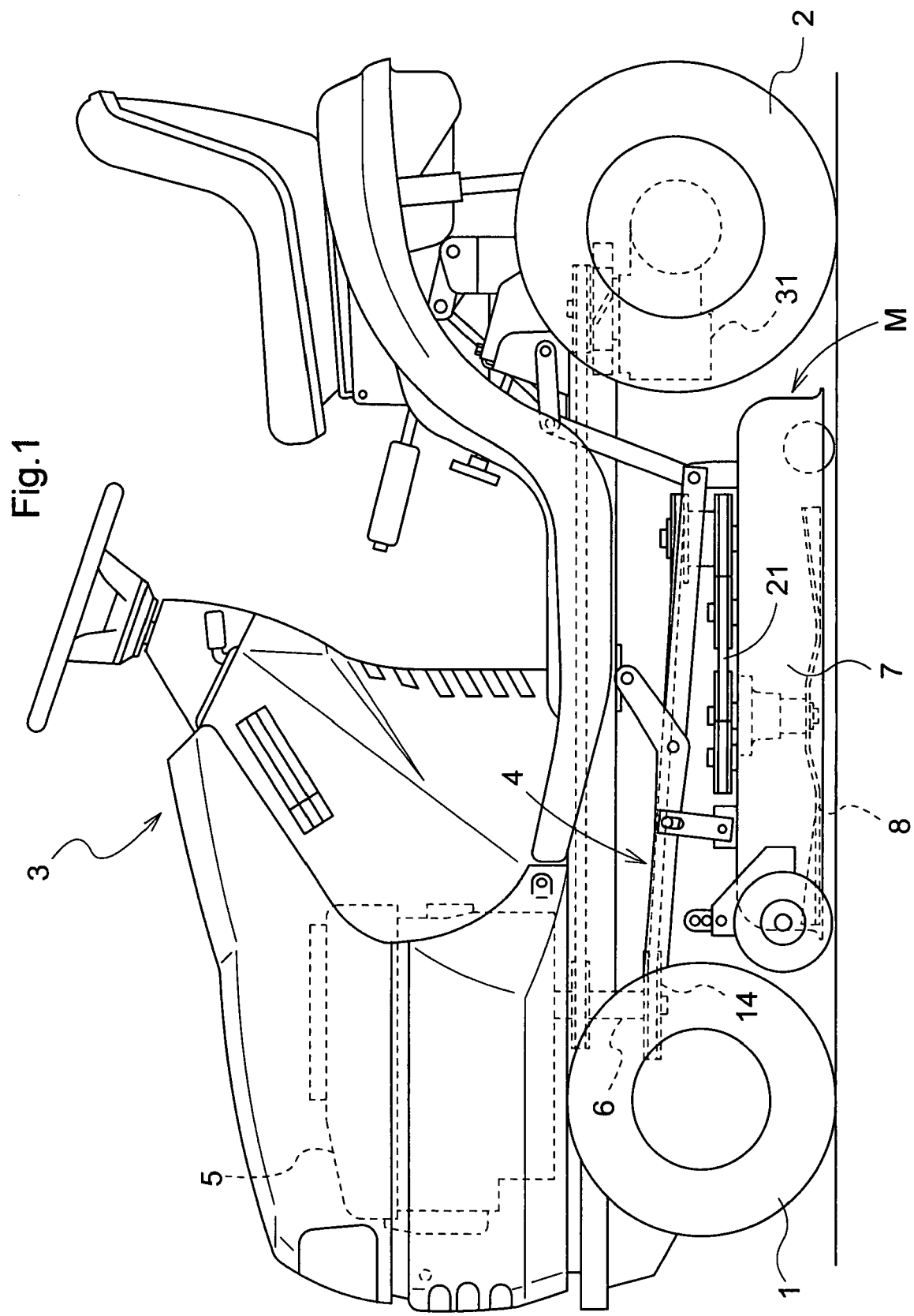
FIG. 1 is a general side view of a riding type lawn mower vehicle.
Figure 2:
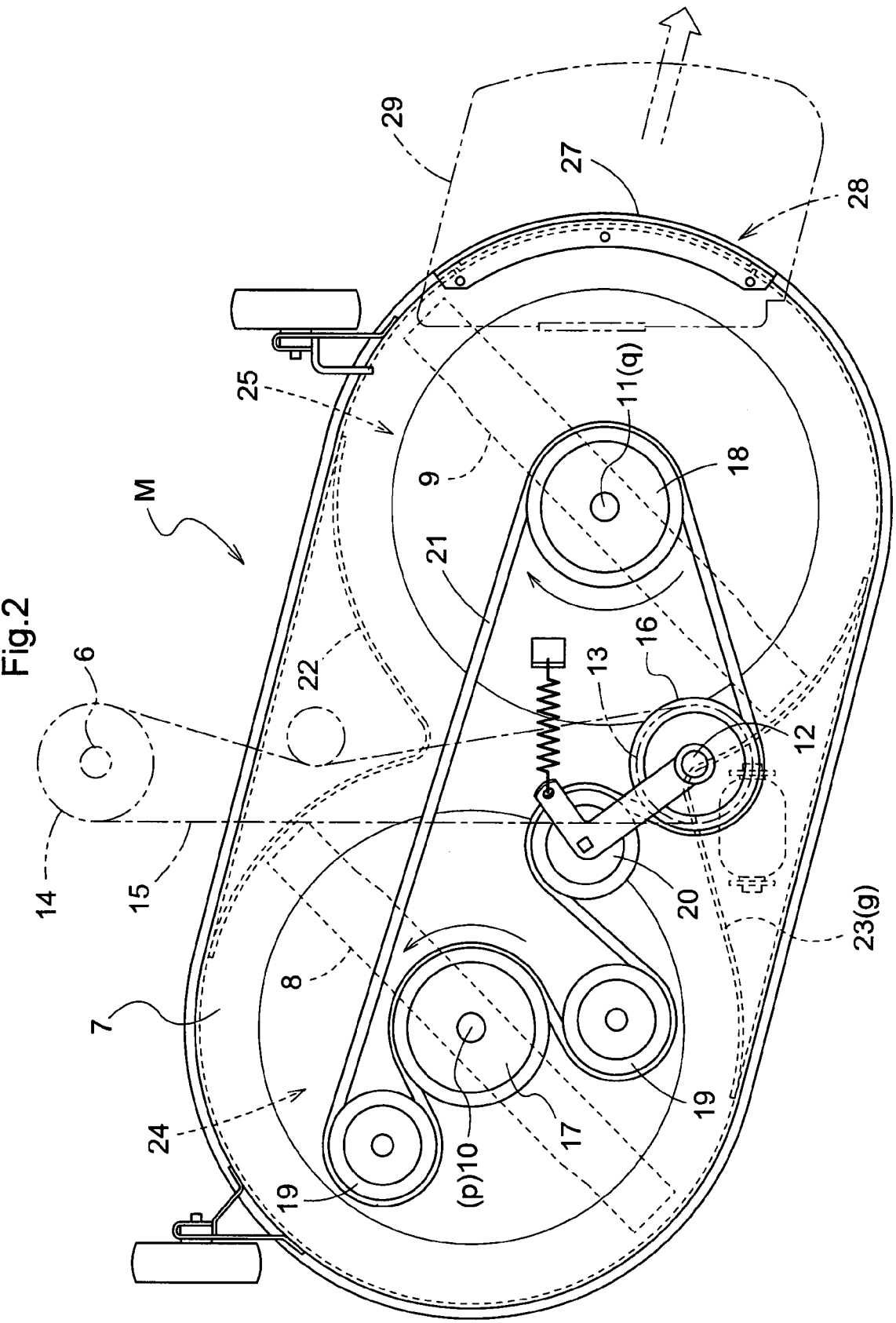
FIG. 2 is a plan view of a mower.

FIG. 1 shows a general side view of a riding type law mower vehicle having a mower M relating to one preferred embodiment of the invention. FIG. 2 shows a general plan view of the mower. This riding type law mower vehicle includes a traveling vehicle body 3 constructed as a rear wheel drive type vehicle having steerable front wheels 1 and non-steerable rear wheels 2. To the lower side of the traveling vehicle body 3, there is connected or suspended the mower M via a link mechanism 4 so that the mower M can be raised or lowered in parallel relative to the vehicle body. At a front portion of the traveling vehicle body 3, there is mounted a vertical shaft type engine 5. Vertical shaft rotational force taken off an output shaft 6 projecting downward from the engine 5 is belt-transmitted in distribution a transmission case 31 mounting the rear wheels 2 and to the mower M, respectively.

As shown in the plan view of FIG. 2, the mower M is constructed as a twin-blade type mower having two cutting blades 8, 9 mounted to a laterally longitudinal oval shaped deck 7 in right/left juxtaposition to be driven by vertical shafts associated respectively therewith. More particularly, the respective cutting blades 8, 9 are operably connected to deck side inner end portions of cutting blade drive shafts 10, 11 mounted to and extending through right and left portions in the top face of the deck 7. The cutting blades 8,9 each comprises a bar blade forming a cutting edge (a) on one of opposed ends of band-plate like steel member and forming a wind generating blade (wing portion) (b) on the other side of the opposed ends.

An input shaft 12 is provided at a rear portion in the right/left center of the top face of the deck 7. A belt 15 is tensely entrained around an input pulley 13 fitted on this input shaft 12 and an output pulley 1 fitted on the output shaft 6 of the engine 5. Also, a single belt 21 is tensely entrained around a cutting blade drive pulley 16 fitted on the input shaft 12, driven pulleys 17, 18 fitted on the respective cutting blade drive shafts 10, 11 and a guide pulley 19 and a tension pulley attached to the deck 7. With these means comprised of the above-described pulleys and belts, the two cutting blades 8, 9 are driven to rotate in mutually opposite directions. And, the rotational directions of the two cutting blades 8, 9 are set such that on vehicle body-wise rear sides of rotational axes (p), (q) thereof, rotational paths of the leading ends of the two cutting blades 8, 9 are in inward opposition to each other.

The mower M is disposed with a slight inclination such that the rotational axis (p) of the cutting blade 8 disposed on the left side of the vehicle body in the plan view is located forwardly of the rotational axis (q) of the cutting blade 9 disposed on the right side of the vehicle body and as the leading end rotational paths of the two cutting blades 8, 9 are slightly overlapped in the fore and aft direction, there will not occur mowing failure of grass between the two cutting blades 8, 9.

Figure 3:
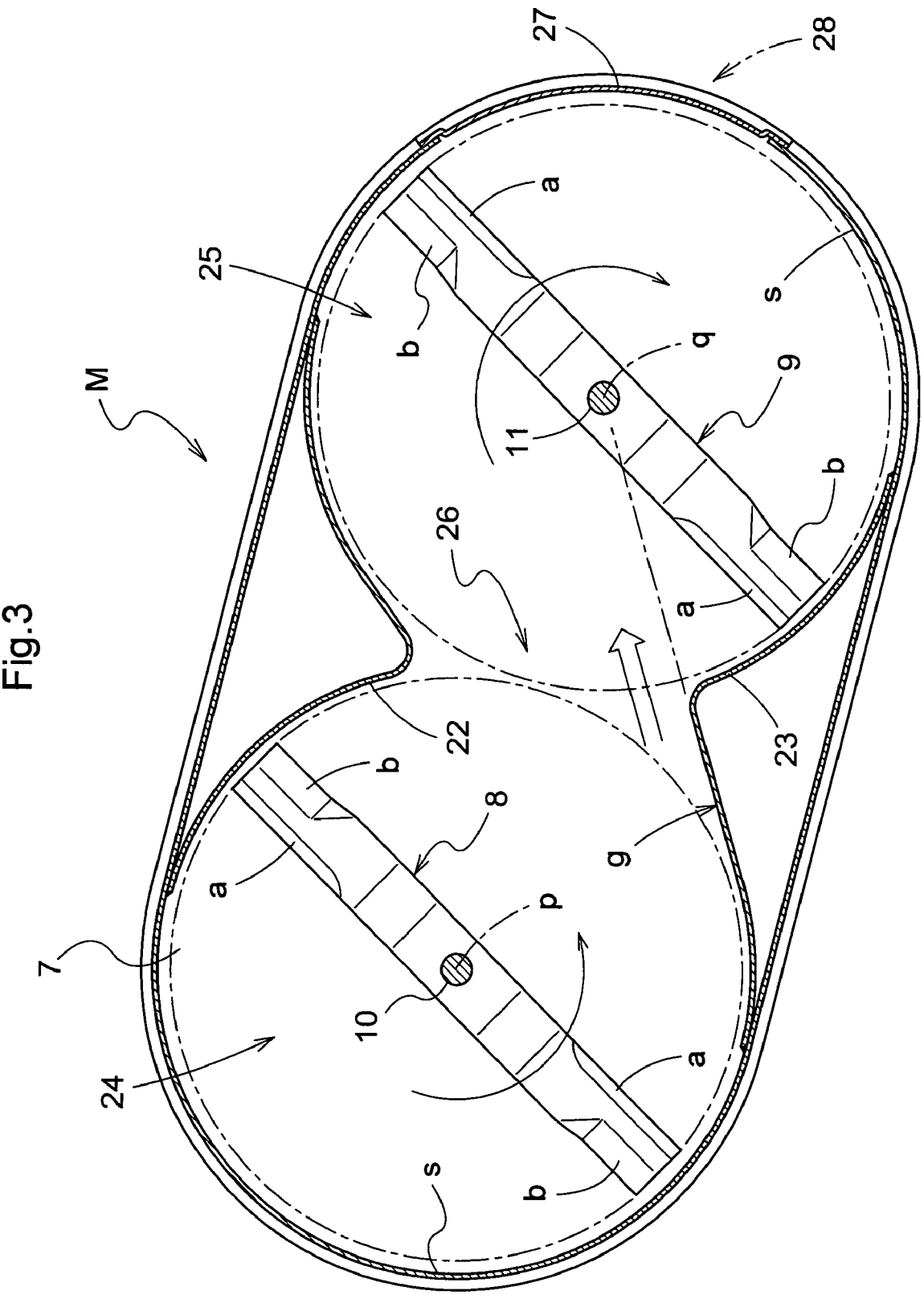
FIG. 3 is a plan view in section showing the mower.

As shown in FIG. 3, at a front center portion and a rear center portion inside the deck 7, there are mounted a front vacuum plate 22 and a rear vacuum plate 23, the vacuum plates having a mountain-like shape in plan view thereof, so that approximately circular cutting chambers 24, 25 are formed for the respective cutting blades 8, 9 along the leading end rotational paths thereof. Top portions of the front vacuum plate 22 and the rear vacuum plate 23 are in spaced opposition to each other, thus forming an opening 26 between the two cutting chambers 24, 25 for allowing flow passage of cut grass therethrough in/out of the respective chambers.

Figure 4:
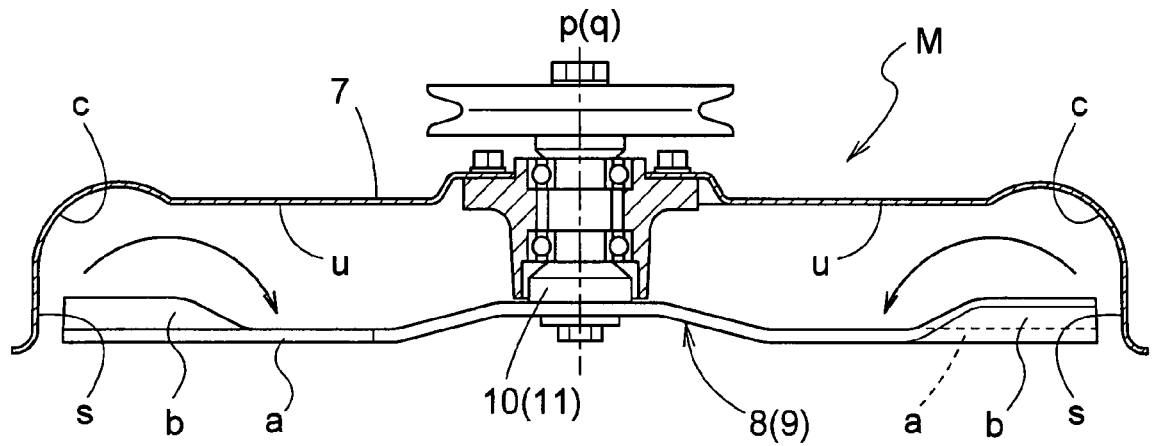
FIG. 4 is a side view in vertical section showing the mower.

As shown in the vertical sectional side view of FIG. 4, a peripheral wall (s) and an upper wall (u) of each cutting chamber 24, 25 is connected to each other via a corner guide face (c) having an arcuate shape in cross section, the guide face (c) being concavely curved toward the inner lower side. As shown in FIG. 3, in the cutting chamber 24 disposed on the left side of the vehicle body, at a peripheral end of the peripheral wall (s) formed by the rear vacuum blade 23 facing the opening 26, there is formed a linear peripheral guide face (g) for guiding cut grass flowing on the cutting air current generated by the left side cutting blade 8 toward the right side cutting chamber 25. And, an extension line of this peripheral guide face (g) is configured to extend to the vicinity of the rotational axis (q) of the right side cutting blade 9.

At a laterally outer portion of the right side cutting chamber 25, there is formed a cut grass discharging outlet 28. When this cut grass discharging outlet 28 is closed, there is provided a mulching mode of the mower in which cut grass is mulched repeatedly and discharged to the outside while the grass is carried in and out of the two cutting chambers 24, 25. Whereas, when a lid cover 27 is removed to open up the cut grass discharging outlet 28, there is provided a side discharging mode of the mower in which the cut grass is guided to the cut grass discharging outlet 28 to be discharged to the right side of the vehicle body.

In the mulching mode, the grass cut in the respective cutting chambers 24, 25 is mulched repeatedly as being carried around and circulated with rotations of the cutting blades 8, 9. In this case, the cut grass conveyed by the cutting air currents generated by the cutting blades 8, 9 is caused to flow in the peripheral direction along the peripheral walls (s), in the course of which the grass is guided by the corner guide face (c) toward the upper walls and then to fall down again as losing its velocity, thus being subjected to cutting actions of the cutting blades 8, 9.

A portion of the grass circulating within the left side cutting chamber 24 will be guided along the peripheral guide face (g) toward the opening 26 and will then enter the right side cutting chamber 25 to be subjected to a cutting action of the cutting blade 9. In this case, as the peripheral guide face (g) is oriented toward the vicinity of the rotational axis (q) of the cutting blade 9, the grass flown into the cutting chamber 25 will flow along a direction substantially normal to the rotational direction of the cutting blade 9, so that this grass will collide the cutting air current and other grass circulating within the cutting chamber 25, so that the entered grass will lose its velocity and be subjected to the cutting action of the cutting blade 9 in an efficient manner.

In the side discharging mode with opening up the cut grass discharging outlet 28 with removal of the lid cover 27, the grass in the right side cutting chamber 25 will first flow along the peripheral wall (s) on the front side of the vehicle body and then be discharged through the cut grass discharging outlet 28 to the right side of the vehicle body. The grass in the left side cutting chamber 24 will flow along the rear side peripheral wall (s), in the course of which this grass will enter, through the opening 26, the right side cutting chamber 25 and then be discharged from the cut grass discharging outlet 28 as being conveyed on the cutting air current of the cutting blade 9 being rotated. In this side discharging mode, by switching a discharge cover 29 attached to the right end of the deck 7 to be pivotally raised relative thereto, into a posture protruding over the cut grass discharging outlet 28, the grass discharged from the cut grass discharging outlet 28 can be guided onto the ground surface without being scattered about upward.

Figure 5:
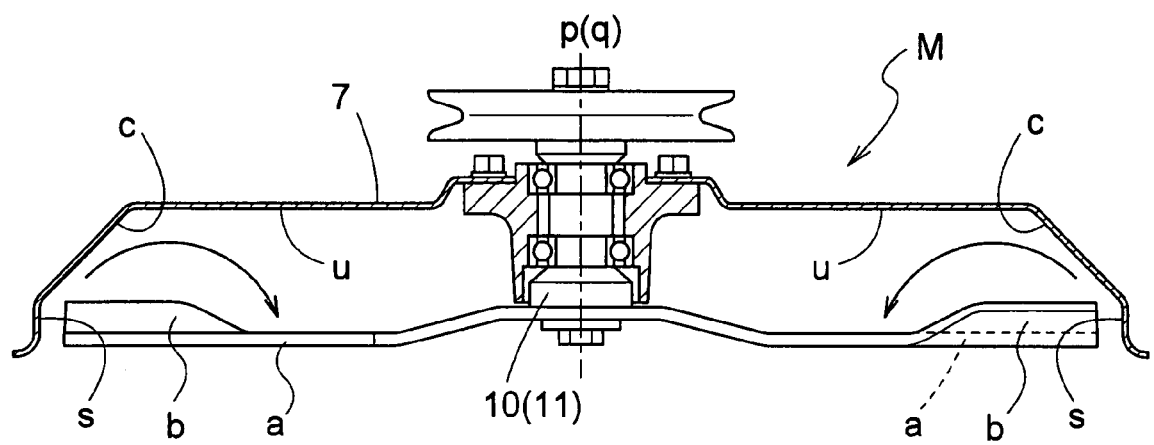
FIG. 5 is a side view in vertical section showing a mower relating to a further embodiment.

Other Embodiments (1) As shown in FIG. 5, the corner guide face (c) interconnecting the peripheral wall (s) and the upper wall (u) can be formed as a straight inclined face extending obliquely downward.

Figure 6:
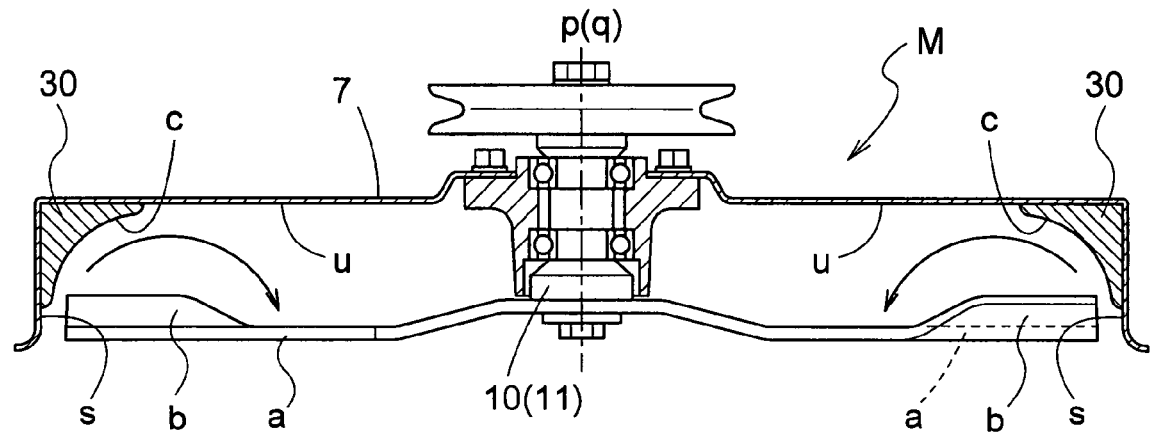
FIG. 6 is a side view in vertical section showing a mower relating to a still further embodiment.

(2) As shown in FIG. 6, the deck 7 can have a such cross sectional shape with the peripheral wall (s) and the upper wall (u) extending continuously at a right angle relative to each other, and at its corner portion, a baffle member 30 made of resin material or the like can be attached, thus forming a corner guide portion (c) extending inwardly and downwardly.

Figure 7:
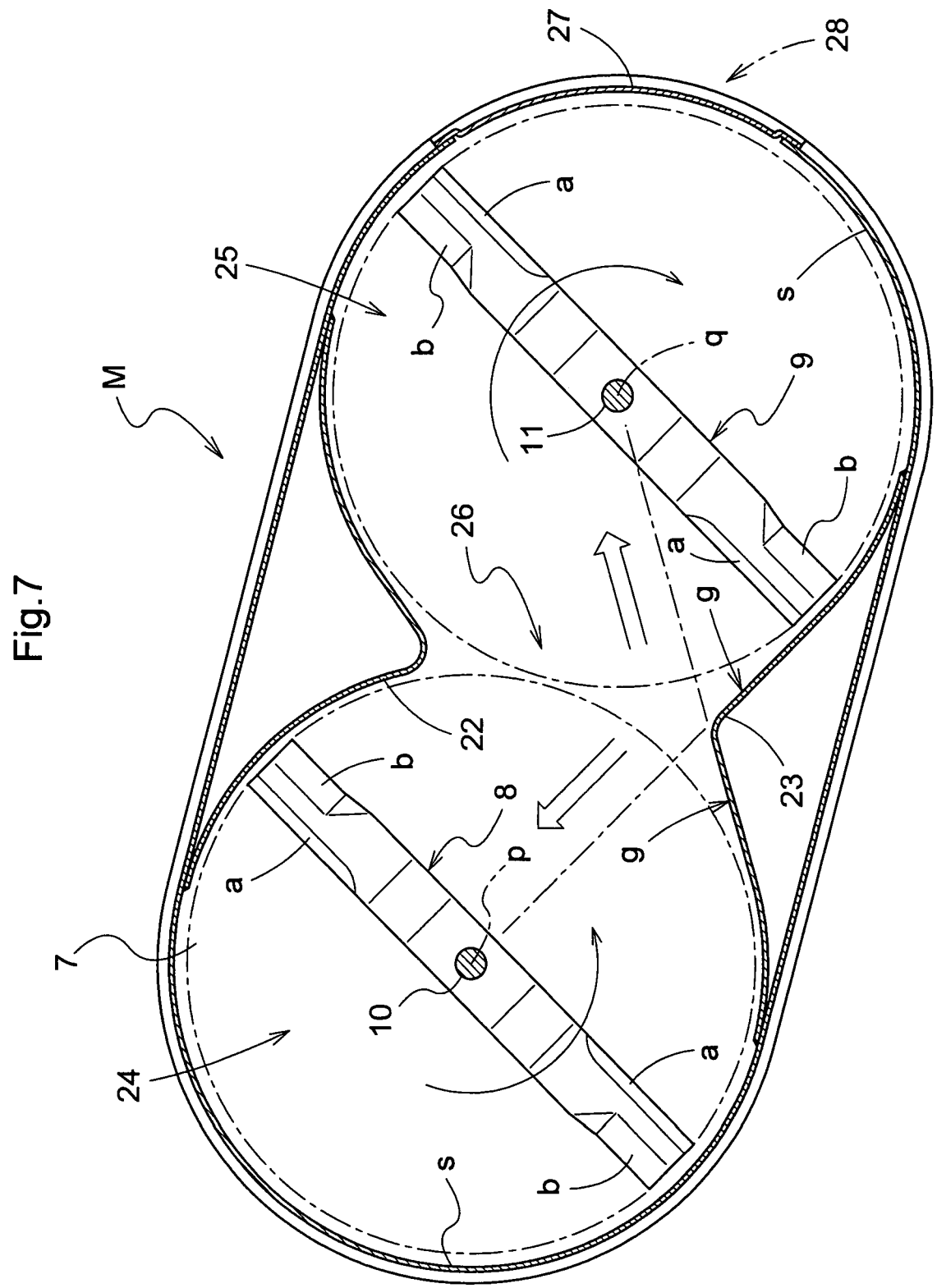
FIG. 7 is a plan view in section showing a mower relating to a still further embodiment.

(3) As shown in FIG. 7, at the peripheral end of the peripheral wall (s) formed by the rear vacuum plate 23 facing the opening 26, there can be formed a peripheral guide face (g) for guiding grass scattered by the left side cutting blade 8 toward the right side cutting chamber 25 and a peripheral guide face (g) for guiding grass scattered by the right side cutting blade 9 toward the left side cutting chamber 24. And, the extension line of each peripheral guide face (g) may be configured to extend to the vicinity of the rotational axis (q), (p) of the cutting blade 9, 8. With these, mutual flows in/out of grass between the two cutting chambers 24, 25 may be promoted, thus enhancing the mulching efficiency.

Figure 8:
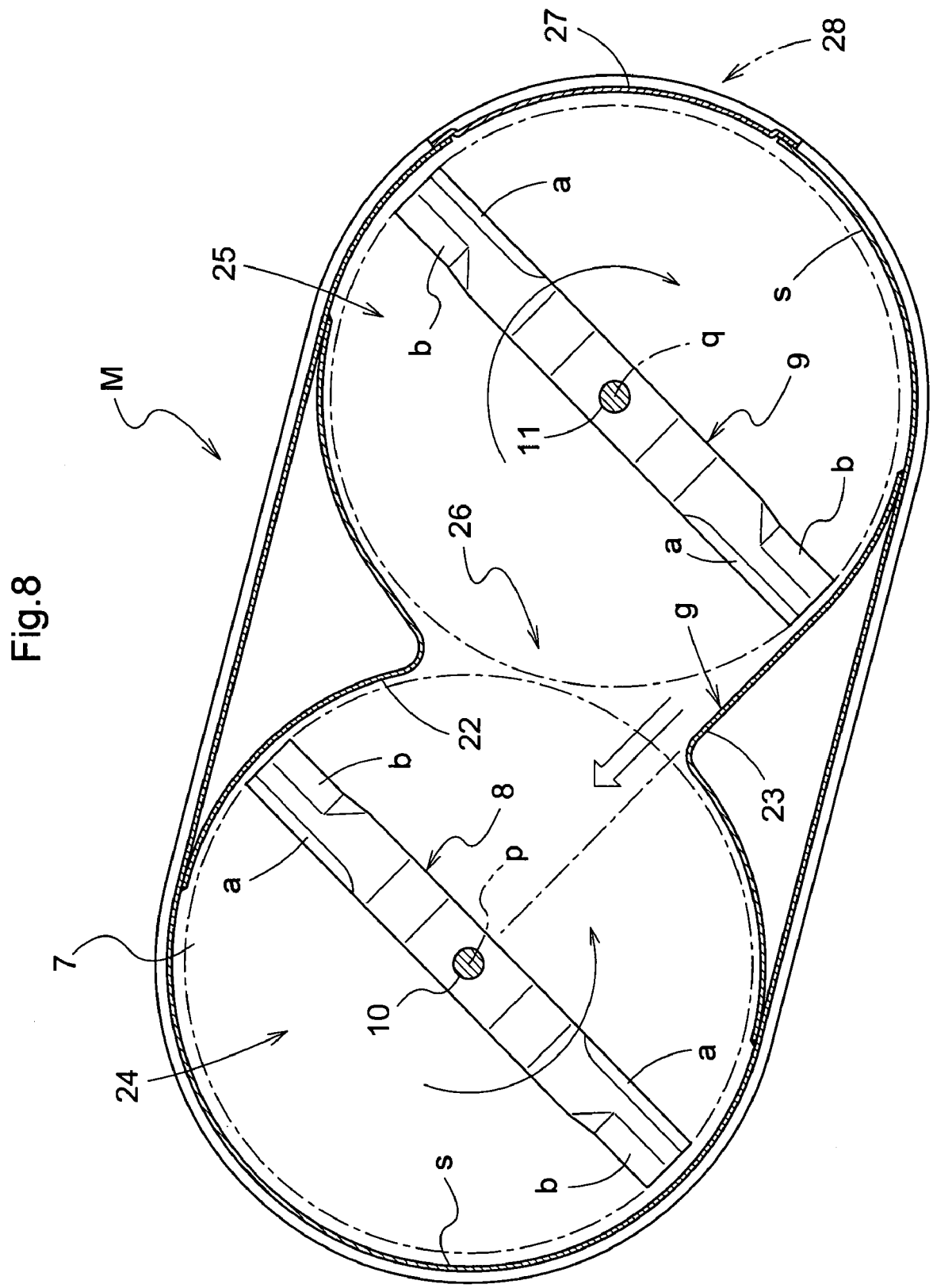
FIG. 8 is a plan view in section showing a mower relating to a still further embodiment.

(4) As shown in FIG. 8, the invention may be embodied still alternatively with providing only one peripheral guide face (g) for promoting the grass flow from the right side cutting chamber 25 to the left side cutting chamber 24.

(5) The invention may be embodied as a mower designed for the mulching mode only, having no cut grass discharging outlet 28.

(6) The invention may be embodied with adopting the above-described construction for adjacent pair of cutting blades to a mower having three cutting blades driven by vertical shafts and juxtaposed along the right/left direction.

What is claimed is:

1. A mower comprising:
   a mower deck that opens downward;
   a plurality of vertical shafts rotatably supported by the mower deck;
   a plurality of cutting blades driven by the vertical shafts inside the mower deck, the cutting blades being arranged generally in a lateral direction, adjacent pair of cutting blades being rotatably driven in opposite directions from each other;
   a cutting chamber formed inside the mower deck and provided for each cutting blade;
   an opening formed between the cutting chambers for adjacent cutting blades, for allowing flow passage of cut grass at least from one of the cutting chambers for the adjacent cutting blades to the other of the cutting chambers for the adjacent cutting blades;
   a first vacuum plate defining a boundary of a first region in a mower travel direction of each of the cutting chambers;
   a second vacuum plate defining a boundary of a second region in the mower travel direction of each of the cutting chambers, the second vacuum plate including:

a linear peripheral guide face formed at a peripheral end portion of a peripheral wall of a first cutting chamber adjacent to the opening, the linear peripheral guide face guiding cut grass scattered by one cutting blade to a second cutting chamber adjacent to the first cutting chamber, an extension line of a tangent line of the linear peripheral guide face extending normal to a rotational trajectory of the cutting blade in the second cutting chamber such that the cut grass guided along the linear peripheral guide face collides with an air current and other grass circulating within the second chamber to reduce the velocity of the cut grass;

an arcuate peripheral guide face formed at a peripheral end portion of a peripheral wall of the second cutting chamber adjacent to the opening; and an apex formed between the linear peripheral guide face and the arcuate guide face, the apex defining an end of the opening in the second region; and a cut grass discharging outlet formed on a side of the second cutting chamber opposite from the opening, wherein a rotating direction of the cutting blade in the first cutting chamber is set such that the cutting blade travels along the opening in a direction away from the linear peripheral guide face, and a rotating direction of the cutting blade in the second cutting chamber is set such that the cutting blade travels along the opening in a direction away from the arcuate peripheral guide face.

2. The mower according to claim 1, further comprising a corner guide face connecting a peripheral wall and an upper wall of each of the cutting chambers, the corner guide face being formed such that a portion closer to a radial center of the cutting chamber is made substantially higher.

3. The mower according to claim 2, wherein said corner guide face is arc-shaped in cross section taken in a vertically extending plane.

4. The mower according to claim 2, wherein said corner guide face is straight in cross section taken in a vertically extending plane.

5. The mower according to claim 2, wherein said corner guide face is formed of resin and detachably fixed to the mower deck.

6. The mower according to claim 2, wherein a lower end of said corner guide face is positioned at a level of an upper face of the cutting blade associated therewith.

7. The mower according to claim 2, wherein said blade has a wing portion at a radially outer side thereof; and an upper end of said corner guide face extends toward a center of the mower deck to a radially central portion of the wing portion.

8. The mower according to claim 1, further comprising a belt and pulley system for rotating two cutting blades of the plurality of cutting blades in directions opposite to each other.

* * * * *

UNITED STATES PATENT AND TRADEMARK OFFICE
CERTIFICATE OF CORRECTION

PATENT NO. : 7,617,665 B2 Page 1 of 1
APPLICATION NO. : 11/714056
DATED : November 17, 2009
INVENTOR(S) : Gill et al.

It is certified that error appears in the above-identified patent and that said Letters Patent is hereby corrected as shown below:

At column 1, line 33, after the word "operator", delete "injury" and insert therefor --injury.--.

In claim 1, at column 7, line 20, after the word "into", delete "the of" and insert therefor --the neck of--.

In claim 4, at column 7, line 55, after the word "the", delete "slot" and insert therefor --slot;--.

In claim 5, at column 8, line 1, after the word "assembly", delete "claim 1," and insert therefor --claim 4,--.

In claim 7, at column 8, line 23, after the word "of", delete "claim 1," and insert therefor --claim 4,--.

In claim 8, at column 8, line 25, after the word "of", delete "claim 1," and insert therefor --claim 4,--.

Signed and Sealed this

Sixteenth Day of February, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,617,665 B2 |
| APPLICATION NO. | : 11/714056 |
| DATED | : November 17, 2009 |
| INVENTOR(S) | : Nobuyuki Yamashita et al. |

It is certified that error appears in the above-identified patent and that said Letters Patent is hereby corrected as shown below:

This certificate supersedes the Certificate of Correction issued February 16, 2010.
The certificate should be vacated since no Certificate of Correction was granted for this patent number.

Signed and Sealed this

Twenty-third Day of March, 2010

David J. Kappos
*Director of the United States Patent and Trademark Office*